United States Patent [19]

Shioda

[11] Patent Number: 5,765,959
[45] Date of Patent: Jun. 16, 1998

[54] SUPPORTING STRUCTURE FOR A ROTATION MEMBER

[75] Inventor: Mitsugu Shioda, Utsunomiya, Japan

[73] Assignee: Nifco Inc., Yokohama, Japan

[21] Appl. No.: 651,931

[22] Filed: May 21, 1996

[30] Foreign Application Priority Data

Sep. 27, 1995 [JP] Japan .................. 7-273560

[51] Int. Cl.$^6$ .................................................. F16B 9/00
[52] U.S. Cl. .................. 403/199; 403/192; 403/384; 403/391; 411/508; 411/509; 49/502
[58] Field of Search ............................. 403/192, 199, 403/384, 386, 389, 391, 405.1, 408.1; 411/508, 509, 510, 338, 339, 913; 49/503, 502; 24/453, 297, 572, 580

[56] References Cited

U.S. PATENT DOCUMENTS

| | | | |
|---|---|---|---|
| 2,075,495 | 3/1937 | Aten | 49/503 X |
| 2,797,129 | 6/1957 | Renno | 49/502 |
| 3,009,381 | 11/1961 | Rapata | 411/508 X |
| 4,151,683 | 5/1979 | Narita et al. | 49/502 |
| 4,647,262 | 3/1987 | Yokota | 24/453 X |
| 4,716,633 | 1/1988 | Rizo | 411/508 X |
| 4,778,320 | 10/1988 | Nakama | 411/509 |
| 4,790,704 | 12/1988 | Temple et al. | 411/508 X |
| 4,865,505 | 9/1989 | Okada | 403/408.1 X |
| 4,952,106 | 8/1990 | Kubogochi et al. | 411/508 X |
| 5,193,933 | 3/1993 | Mailey | 24/453 X |
| 5,651,634 | 7/1997 | Kraus | 403/408.1 |

FOREIGN PATENT DOCUMENTS

S63-117970  1/1987  Japan .

*Primary Examiner*—Daniel P. Stodola
*Assistant Examiner*—Bruce A. Lev
*Attorney, Agent, or Firm*—Kanesaka & Takeuchi

[57] ABSTRACT

A structure for supporting a rotation member to an attached member is formed of a clip for rotationally supporting the rotation member to the attached member, and circular member. The clip includes a leg elastically engaging a hole in the attached member, a shaft part fixed to the leg and disposed in a hole of the rotation member for rotationally supporting the rotation member, and a stopping piece attached to the shaft part for preventing the rotation member from coming off from the shaft part. The circular member has a hole in which the shaft part of the clip is disposed, and an elastic pressing piece situated outside the hole. The circular member is disposed between the rotation member and the attached member to elastically press the rotation member to the stopping piece.

7 Claims, 3 Drawing Sheets

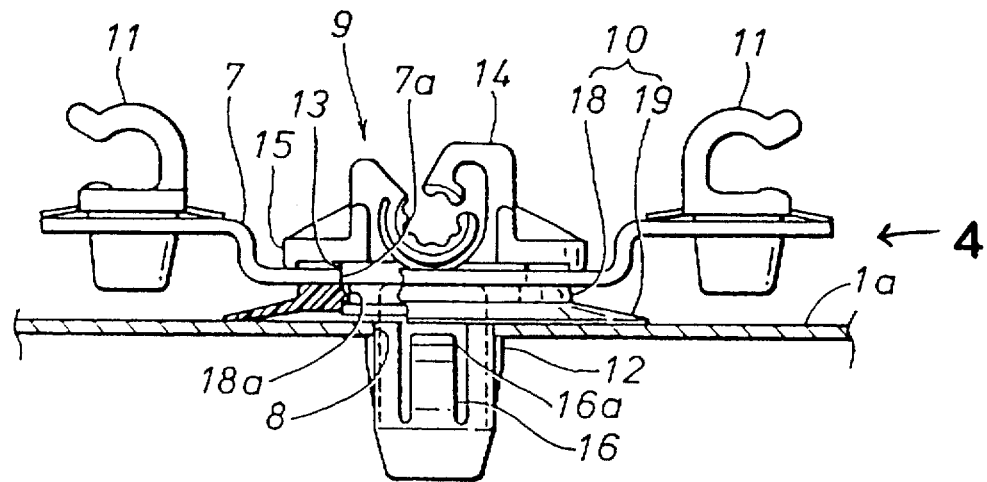
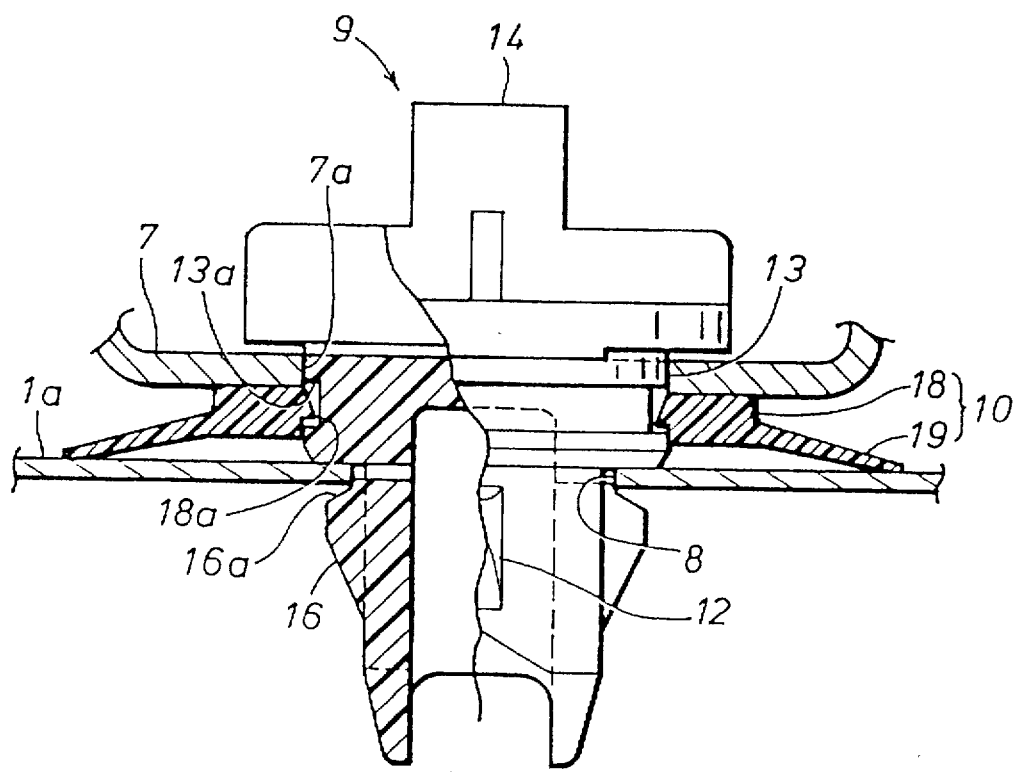

SUPPORTING STRUCTURE FOR A ROTATION MEMBER

BACKGROUND OF THE INVENTION AND RELATED ART STATEMENT

The present invention relates to a supporting structure for a rotation member, and more particularly, to a structure for rotationally supporting a rotation member to be rotatable around an axis situated substantially perpendicular to an attached member.

Conventionally, for example, in a link mechanism used for a door lock device of an automobile, a bell crank disposed between two rods for connecting the same is rotatably supported by a supporting member attached to a door panel. For example, in the supporting member, a clip is elastically fixed in an engagement hole formed in the door panel, and an axis part of a clamp, which rotationally holds the rods extending across the bell crank, is coaxially fitted with the clip to thereby couple the clamp and the clip together. In the clamp, a boss is provided coaxially to a shaft part thereof, and a supporting hole bored at the bell crank is engaged with the boss, so that the clip and the clamp sandwich the bell crank to prevent the bell crank from coming off. Therefore, the bell crank is rotationally attached around the shaft formed substantially perpendicular to the surface of the door panel.

In the above described structure, however, since a supporting member is formed of two members, it is liable to bend at a middle portion in the axial direction. Furthermore, in the boss pivotally supporting the bell crank, since the clip is located between the boss and the door panel, depending on a direction of movement of the rod, the clamp might be pulled out from the clip. Also, the shaft part is fitted with the clip for assembly, and the assembly is fixed to the engagement hole of the door panel. Thus, a shape of an engagement leg of the clip for engaging the door panel is limited, and as a result, it is difficult to form the engagement leg in a mechanically strong shape.

As disclosed in Japanese Utility Model Publication (KOKAI) No. 63-117970, a holder as a supporting member is structured by a single shaft member formed of a door side shaft part for inserting into the attachment hole of the door panel and a bell crank side shaft part for rotationally supporting the bell crank, and a plate extending radially outwardly from the shaft is integrally formed between the both shaft parts. According to this structure, the supporting member is formed of a single member and does not cause the aforementioned problem as in the supporting member formed of two members. However, the plate-like bell crank is located between the plate and an elastic protrusion formed on the bell crank side shaft part and is rotationally supported, and in order to rotationally support the bell crank, it is necessary that a space between the elastic protrusion and the plate is made larger than the width of the bell crank. Therefore, there is a problem that a looseness or wobbling might happen in the bell crank.

In view of the foregoing, an object of the present invention is to provide a supporting structure of a rotation member which can rotationally support the rotation member and prevent the looseness or wobbling to the minimum degree.

Another object of the invention is to provide a supporting structure as stated above, which can be easily manufactured without trouble.

Further objects and advantages of the invention will be apparent from the following description of the invention.

SUMMARY OF THE INVENTION

A structure of the invention is to support a rotation member, such as a bell crank, to an attached member, such as a door panel. The structure is formed of a clip for rotationally supporting the rotation member to the attached member, and a circular member disposed between the rotation member and the attached member to elastically press the rotation member to a stopping piece.

The clip includes a leg elastically engaging a hole in the attached member, and a shaft part fixed to the leg and disposed in a hole of the rotation member for rotationally supporting the rotation member. The stopping piece is attached to the shaft part for preventing the rotation member from coming off from the shaft part. The circular member has a hole in which the shaft part of the clip is disposed, and an elastic pressing piece situated outside the hole. Accordingly, the rotation member is rotationally held on the shaft part while elastically biased by the elastic pressing piece of the circular member.

The circular member has a ring part around the hole thereof. The elastic pressing piece extends radially outwardly around the ring part and inclines obliquely in a direction opposite to the stopping piece. Thus, the rotation member is urged toward the stopping piece by the elastic pressing piece.

Also, the shaft part of the clip includes an annular recess, in which an inner edge around the hole of the circular member is engaged. Thus, the circular member is held in the clip.

BRIEF DESCRIPTION OF THE DRAWINGS

FIG. 2 is a partially sectional view as seen from an arrow 2 in FIG. 1 for showing a supporting structure of a bell crank according to the present invention;

FIG. 4 is a partially sectioned longitudinal view of a main part of the bell crank as seen from an arrow 4 in FIG. 2.

DETAILED DESCRIPTION OF PREFERRED EMBODIMENTS

An embodiment of the present invention is described hereinafter with reference to an example as shown in the attached drawings.

Figure 1:
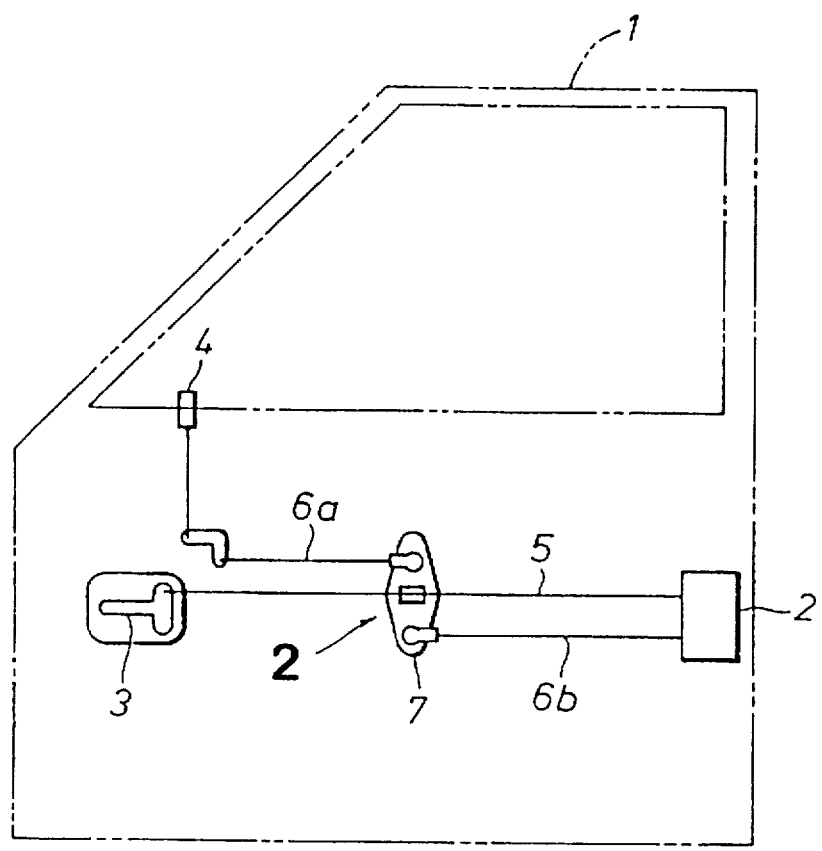
FIG. 1 is a schematic view diagrammatically showing a link mechanism of a door lock device in an automobile according to the present invention.

FIG. 1 is a schematic view diagrammatically showing a link mechanism of a door lock device in an automobile according to the present invention. As shown in FIG. 1, in a door 1 of the automobile, a door lock 2 which can selectively latch to a body of the automobile, an inner handle 3 for releasing the latch of the door lock 2, and a lock knob 4 for selectively locking the latch state of the door lock 2 are disposed. The door lock 2 and the inner handle 3 are connected to each other through a rod 5, and the door lock 2 and the lock knob 4 are connected to each other through two rods 6a and 6b and a bell crank 7 disposed at an intermediate part between the rods 6a and 6b.

Figure 3:
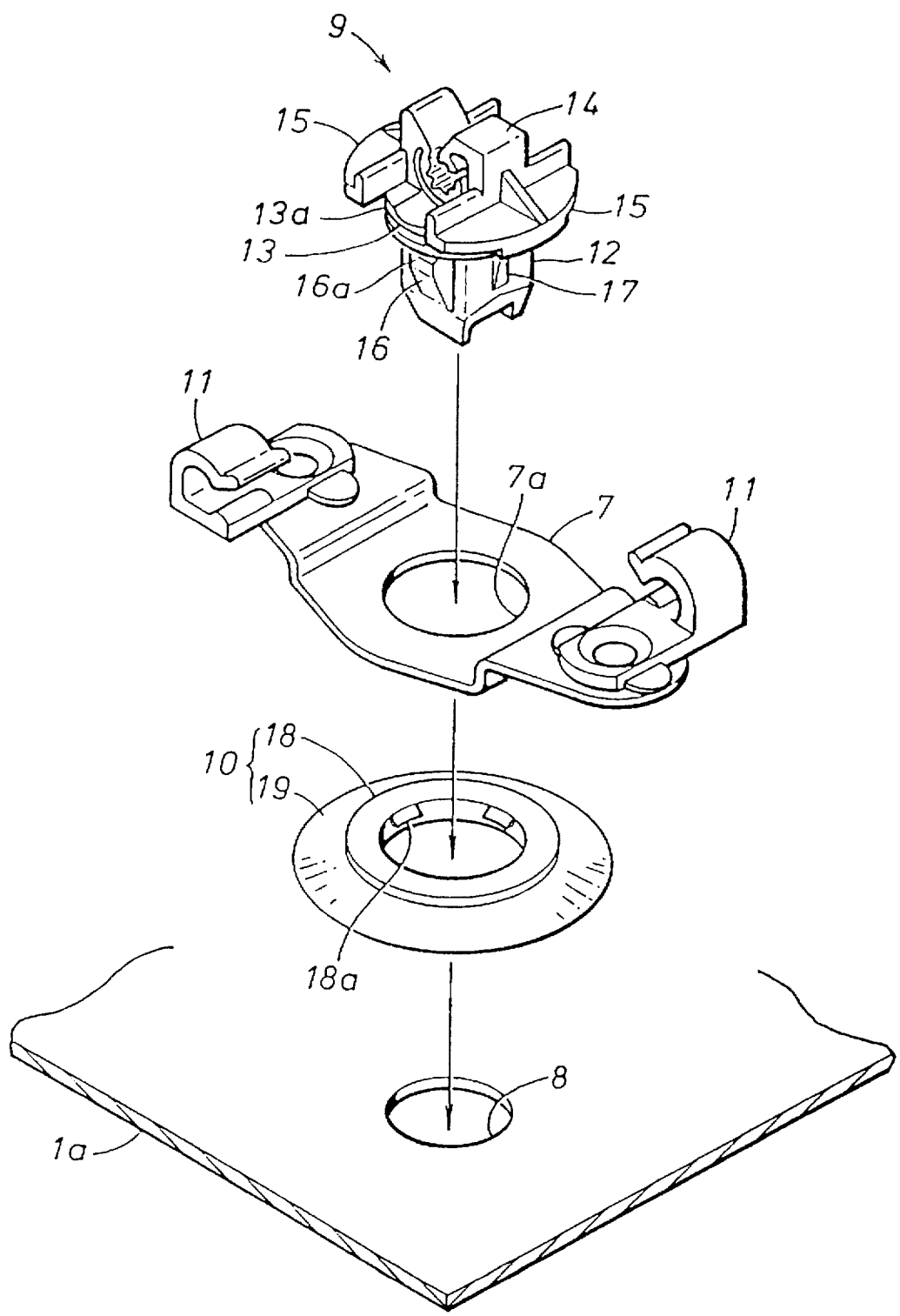
FIG. 3 is an exploded perspective view of the supporting structure of the bell crank according to the present invention.

FIG. 2 is a side section view, as seen from an arrow 2 in FIG. 1, for showing a supporting structure of a plate-like rotation member according to the present invention, which rotationally supports the bell crank 7 as a plate-like rotation member. FIG. 3 is an exploded perspective view thereof.

As shown in FIGS. 2 and 3, the supporting structure is formed of a clip 9 attached to an engagement hole 8 bored in a door panel 1a, and an annular member 10 disposed between the bell crank 7 and the door panel 1a. The bell crank 7 is rotationally supported by the clip 9.

The bell crank 7 is formed of a flat oblong metal plate, which is bent into a crank-shape near both ends thereof in the longitudinal direction such that the both ends are biased in an axial direction with respect to a central portion in which a hole 7a is bored. Rod holders 11 for connecting the rods 6a and 6b are rotatably attached to the both ends, respectively.

The clip 9 is formed of a leg 12 with a rectangular external shape which can be inserted into the engagement hole 8; a disc-shaped shaft part 13 disposed at a base end side in a projecting direction of the leg 12 to fit into a support hole 7a and having the diameter larger than that of the leg 12; a clamp 14 disposed at a side opposite to a leg; and a pair of stopping pieces 15 located adjacent to the clamp 14 and formed symmetrical to each other with respect to an axial line. The clip 9 is made from a synthetic resin.

In the leg 12 of the clip 9, there is provided a pair of elastic stopping or engaging pieces 16, which project outwardly from a pair of side walls of the leg facing against each other and is provided with claw portions 16a. When the leg 12 is inserted into the engagement hole 8, the claw portions 16a of the elastic stopping pieces 16 are engaged with the engagement hole 8 at a rear surface side of the door panel 1a to thereby attach the clip 9 to the door panel 1a. Incidentally, in the other pair of side walls of the leg 12, there are provided protruding strips 17 extending in an axial direction of the leg 12 to prevent looseness upon attaching the clip into the engagement hole 8.

The circular member 10 is formed of a doughnut-like or annular ring 18 with a rectangular section, and an elastic pressing piece 19 in a form of a belleville spring which extends from an entire outer periphery of the ring 18 radially outwardly and obliquely with respect to the axial line thereof. The circular member 10 is formed of a synthetic resin. Incidentally, four engaging claws 18a which project radially inwardly from the inner peripheral surface of the ring 18 are disposed equally spaced apart from each other in the periphery thereof. Also, at a middle portion of an axial direction of the shaft part 13 of the clip 9, a peripheral recess 13a is formed. When the circular member 10 is assembled with the clip 9, the engaging claws 18a are engaged with the peripheral recess 13a to thereby assemble the clip 9 with the circular member 10.

Also, a pair of the stopping pieces 15 has the outer diameter relatively larger than that of the shaft part 13, and is used for preventing the bell crank 7, which is attached to the clip 9 by fitting the pivot hole 7a in the axis part, from coming off.

Incidentally, the clamp 14 is constructed to elastically support the rod 5 connecting the door lock 2 with the inner handle 3, and to hold the rod 5 to be rotatable in the axial direction thereof.

In the supporting structure of the rotation member constructed as described above, the shaft part 13 of the clip 9 is fitted with the bell crank 7, and the circular member 10 is engaged with the peripheral recess 13a. Thus, the clip 9 is assembled with the circular member 10, and then, the clip 9 is fixed to the door panel 1a. Therefore, it is possible to handle the bell crank 7 in a condition that the bell crank 7 is temporarily attached to the clip 9, so that handling and assembling work can be done easily.

As shown in FIGS. 2 and 4, in a state that the shaft part 13 abuts against the surface of the door panel 1a and the leg 12 is completely inserted into the engagement hole 8 in the door panel 1a, the elastic stopping pieces 16 are returned to an original position by elastic restoring force, and the claw portions 16a of the elastic stopping pieces 16 are engaged with a rim of the engagement hole 8 at the rear surface side of the door panel 1a to thereby prevent the clip 9 from coming off from the door panel 1a. Since the space or distance in the axial direction between the shaft part 13 and the claw portions 16a of the elastic stopping pieces 16 coincides with the thickness of the door panel 1a, the leg 12 is securely fixed to the door panel 1a. Thus, the clip 9 can be attached to the door panel 1a without substantial looseness or wobbling.

When the clip 9 is attached to the door panel 1a, the elastic pressing piece 19 of the circular member 10 abuts against the door panel 1a and is deformed elastically, so that the ring 18 is elastically pressed to the bell crank 7. Since the bell crank 7 is held at a certain holding power by means of the stopping pieces 15 and the ring 18, the looseness in the bell crank 7 with respect to the clip 9 can be desirably restrained. Incidentally, a shape of the elastic pressing piece 19 is a circular flange, and the outer rim portion contacts the door panel 1a closely along the entire periphery. Thus, waterproofness against permeating water from outside can be desirably obtained.

Also, a pressing force by the elastic pressing piece 19 against the bell crank 7 is obtained by inclining the elastic pressing piece 19 toward a shaft side to some high degree. According to the present invention, since the clip 9 and the circular member 10 are constructed separately, the circular member 10 and the clip 9 can be manufactured by using independent metallic molds.

In case the clip with the flange is constructed as a single member, a pulling direction of a metallic mold for the clip is a direction perpendicular to the axial direction of the clip. Thus, as the inclination angle of the flange toward the axis increases, the large load is applied to the metallic mold when the metallic mold is removed, so that the metallic mold is liable to be damaged. Therefore, it is difficult to make the flange in the inclined shape. Consequently, the large elastic holding power against the bell crank, which is caused by the elastic deformation of the flange, can not be obtained, resulting in the loose attachment of the clip to the door panel.

With respect to this point, according to the present invention, since the circular member 10 having the elastic pressing piece 19 in the flange shape is constructed separately from the clip 9, the pulling or separating direction of the metallic mold for shaping the circular member 10 can be aligned in the axial direction. Therefore, when the inclination angle against a surface perpendicular to the axis of the elastic pressing piece 19 is increased, there would be no problem and the elastic pressing piece 19 with a desirable elastic urging force can be obtained.

As described above, according to the present invention, the circular member is formed separately from the clip for attaching to the attached member, and the plate-like rotation member is held elastically by the elastic urging force of the elastic pressing piece formed in the circular member. Therefore, when the circular member is formed, the pulling or separating direction of the metallic mold for the circular member can be aligned in the axial direction. Accordingly, in order to strengthen the urging force by the elastic deformation of the elastic pressing piece, the elastic pressing piece can be inclined close to the axis side. Thus, the rotation member in the plate shape is held by high elastic urging force to thereby reduce looseness thereof to the minimum degree.

While the invention has been explained with reference to the specific embodiment of the invention, the explanation is illustrative and the invention is limited only by the appended claims.

What is claimed is:

1. A structure for supporting a rotation member with a hole to an attached member with a hole, comprising:

a clip for rotationally supporting the rotation member to the attached member, said clip including a leg adapted to elastically engage the hole in the attached member, a shaft part fixed to the leg and adapted to be disposed in the hole of the rotation member for rotationally supporting the rotation member, said shaft part having an annular recess, a stopping piece attached to the shaft part for preventing the rotation member from coming off from the shaft part, and an engaging piece formed on the leg to project outwardly from the leg adapted to engage the hole in the attached member, and a circular member having a hole in which the shaft part of the clip is disposed, a ring part disposed around the hole, a plurality of engaging claws extending into the hole from the ring part, said engaging claws engaging the annular recess when the circular member is assembled with the clip, and an elastic pressing piece situated outside the hole and extending radially outwardly and obliquely around the ring part, said circular member being adapted to be disposed between the rotation member and the attached member to elastically press the rotation member to the stopping piece.

2. A structure according to claim 1, wherein the elastic pressing piece has a shape of a belleville spring.

3. A structure according to claim 1, wherein said stopping piece is formed of a pair of stopping pieces extending radially outwardly from the shaft part.

4. A structure according to claim 1, wherein said clip further includes a clamp disposed on the stopping piece adapted to elastically support a rod therein.

5. A structure for supporting a rotation member with a hole to an attached member with a hole, comprising:

a clip for rotationally supporting the rotation member to the attached member, said clip including a leg adapted to elastically engage the hole in the attached member and having a rectangular external shape, a disc-shaped shaft part fixed to an upper end of the leg and adapted to be disposed in the hole of the rotation member for rotationally supporting the rotation member, a stopping piece attached to the shaft part for preventing the rotation member from coming off from the shaft part, and an engaging piece attached to the leg adapted to pass through the hole of the attached member and engage the attached member, and a circular member having a hole in which the shaft part of the clip is disposed, a ring part around the hole and an elastic pressing piece situated outside the hole, said elastic pressing piece extending radially outwardly around the ring part and inclining obliquely relative to the ring part, said circular member being adapted to be disposed between the rotation member and the attached member to elastically press the rotation member to the stopping piece.

6. A structure according to claim 5, wherein said shaft part of the clip includes an annular recess, said recess being engaged with an edge of the hole of the circular member so that the circular member is fitted with the clip.

7. A structure according to claim 5, wherein said circular member is provided with a plurality of engaging claws extending into the hole thereof, said engaging claws engaging an annular recess of the shaft part to assemble the clip and the circular member.

* * * * *